United States Patent [19]
Zuber et al.

[11] Patent Number: 5,882,549
[45] Date of Patent: Mar. 16, 1999

[54] PASTES FOR FIRED-ON LAYERS

[75] Inventors: Ralf Zuber, Grossostheim; Knut Fehl, Schlüchtern; Willi Peter, Blankenbach; Elisabeth Kasper, Dietzenbach, all of Germany

[73] Assignee: Degussa Aktiengesellschaft, Frankfurt am Main, Germany

[21] Appl. No.: 968,090

[22] Filed: Nov. 12, 1997

[30] Foreign Application Priority Data

Nov. 14, 1996 [DE] Germany .......................... 196 47 044.7

[51] Int. Cl.⁶ .................................. H01B 1/22; B05D 5/12
[52] U.S. Cl. ........................... 252/514; 252/512; 427/58; 427/383.5; 427/383.7
[58] Field of Search ..................... 252/511, 512, 252/513, 514; 427/58, 61, 125, 383.5, 383.7

[56] References Cited

U.S. PATENT DOCUMENTS

| | | | |
|---|---|---|---|
| 4,904,411 | 2/1990 | Novich et al. | 252/309 |
| 5,242,623 | 9/1993 | Morrison, Jr. | 252/512 |
| 5,492,653 | 2/1996 | Hochheimer et al. | 252/514 |
| 5,658,499 | 8/1997 | Steinberg et al. | 252/514 |
| 5,756,008 | 5/1998 | Slutsky et al. | 252/514 |

FOREIGN PATENT DOCUMENTS

| | | |
|---|---|---|
| 0272665A | 12/1987 | European Pat. Off. . |
| 011079279A | 3/1989 | Japan . |
| WO 96/03466 | 2/1996 | WIPO . |

*Primary Examiner*—Mark Kopec
*Attorney, Agent, or Firm*—Beveridge, DeGrandi, Weilacher & Young, L.L.P.

[57] ABSTRACT

A stable paste for fired-on layers which produces few pyrolysis products contains 0.3 to 3 wt. % of polyethylenimine as binder. The binder inhibits sedimentation of the contents of the paste.

7 Claims, No Drawings

PASTES FOR FIRED-ON LAYERS

INTRODUCTION AND BACKGROUND

The present invention relates to a paste for preparing fired-on layers, in particular in the microelectronics industry, containing finely divided metallic and/or non-metallic powders and a binder of a water-soluble organic polymer and a water-soluble organic solvent.

Switching circuits for microelectronics and also for rear window heaters for cars are generally produced in a mass production process using these types of paste. For this purpose, the pastes are applied to the corresponding substrate and dried at temperatures of up to 200° C. in order to remove volatile constituents. During a subsequent firing process at temperatures up to 800° C., all of the other organic substances are removed and the layer is thereby compacted.

Pastes for producing thick fired-on layers using a silk screen process generally contain a large proportion of organic solvents and polymeric binders. Some of the solvents used present a health risk. Special occupational safety measures have to be adopted, therefore, when processing the pastes and cleaning the equipment which has been used. In addition, considerable amounts of solvent and organic pyrolysis products are released when drying and firing the layers and these may also be harmful to the health of workers.

A screen printable paste of this type is described, for example, in U.S. Pat. No. 5,242,623. It consists of finely divided, electrically conductive metal powders in an organic binder which is composed of several organic polymers such as polyacrylates, polyesters, polyamides, polyvinyl alcohol or ethyl cellulose, in an organic solvent such as high-boiling alcohols or terpenes.

Recently, efforts have been made to replace at least some of the solvent with water in order to minimize the amounts of health hazardous substances and in order to enable the removal of paste residues with water.

U.S. Pat. No. 5,492,653 describes a paste for the application of electrically conductive layers onto substrates in the electronics field, these consisting of silver platelets, a water-soluble polymer, in particular a polyacrylic compound, water and a water-soluble organic solvent, such as aliphatic alcohols with 6 to 18 carbon atoms, which has a boiling point higher than that of water. This paste, however, is not suitable for screen printing and produces health hazardous pyrolysis products during the firing process.

The spray process used in U.S. Pat. No. 5,492,653 is greatly inferior to the screen printing process with regard to product quality. This applies in particular to contour sharpness and surface roughness. Stringent specifications for these types of products can only be satisfied by using the screen printing process.

A water-based screen printing paste is also described in WO 9603466. The rheology of the pastes is adjusted for screen printing applications by using alkali-swellable polymeric binders. Due to the high volatility of the main solvent, water, however, the processing time is very restricted. The paste dries out and continuous use in a mass production process is thus impossible.

Therefore, screen printing pastes with organic solvents which are not very volatile are still being used.

Water is also unsuitable as the main solvent in other applications where retention of the rheological properties over a long processing time is required, despite working under normal atmospheric conditions, such as for example for the edge-metallization of capacitors.

Although a paste in accordance with EP-OS 0 630 031 can be removed with water, it contains, as solvent, organic liquids whose rates of evaporation are slower than that of water by a factor of at least 2. It therefore preferably contains higher glycols as solvent and polyvinylpyrrolidones and polysaccharides as binders. These pastes have the disadvantage that, when they are stored for progressively longer times, they form a solid sediment which can no longer be stirred up.

Thus, an object of the present invention was to provide a paste for producing fired-on layers, in particular for the microelectronics industry which avoids problems encountered in the past.

A further object of the present invention is to provide a paste which does not form a deposit over relatively long storage times, or forms a deposit which can be stirred up, and which forms the fewest possible health hazardous decomposition products.

SUMMARY OF THE INVENTION

The above and other objects of the present invention are achieved through use of a novel paste which comprises at least one finely divided metallic and/or non-metallic powder, and a binder of at least one water-soluble organic polymer and a water-soluble organic solvent.

More particularly, these objects are achieved in accordance with the invention by using a polyethylenimine in an amount of 0.3 to 3 wt. %, with reference to the total weight of paste, as the organic polymer.

The paste preferably contains 0.4 to 0.9 wt. % of polyethylenimine.

As organic solvent, the paste preferably contains 8 to 17 wt. % of at least one polyalcohol, up to 40% of which may be replaced by water. Glycols (diols) and glycerine have proven particularly suitable as polyalcohols for use in accordance with the invention.

DETAILED DESCRIPTION OF THE INVENTION

The alcohols and polyethylenimines used in this invention are not hazardous to health. The use of polyethylenimine leads to a clear reduction in the amount of polymer and solvent required in the paste, without impairing the properties required for the screen printing process. The use of polyethylenimine, surprisingly, ensures that the pastes have long-term stability and high resistance to forming sediments, despite the small amounts. The paste becomes thinner under shear and can be readily processed in a screen printing process, despite a reduced proportion of solvent. This produces a marked reduction in the amounts of organic solvents and organic pyrolysis products released during processing and also improved conductivity of the fired-on layers.

Particular advantages are also produced with respect to the sedimentation properties of the pastes. Even when stored for a long time only slight deposition of the solids takes place so the pastes may therefore be stirred up again very easily, for example by hand. The addition of anti-sedimentation agents is unnecessary.

The paste composition according to the invention can be washed off with water.

If appropriate processing conditions are being used, some of the solvent and/or solvent mixture may be replaced by water. The proportion of water may then be up to 40%, preferably up to 10%. Here again, a clear reduction in the amount of organic emissions is produced during planned use in a mass production process.

The following examples are intended to explain the advantages of pastes according to the invention in more detail:

1. In accordance with the formulation given in Table 1, the constituents of the paste are mixed in a porcelain dish and then dispersed using a three-roller apparatus.

TABLE 1

| | |
|---|---|
| 53% | Ag powder 332 (particle size $d_{50}$ = 4 μm, produced by DEMETRON, Hanau) |
| 15% | Ag flakes D21 (particle size: 16% < 4 μm, 50% < 8 μm, 84% < 15 μm DEMETRON, Hanau) |
| 17% | 1,3-butanediol |
| 5% | sintered glass 10 145 (83% PbO, 13% $B_2O_3$, 2% $SiO_2$, softening point 390° C., produced by Cerdec, Frankfurt) |
| 8% | water |
| 2% | polyvinylpyrrolidone. |

This paste, which is in accordance with the prior art, is printed onto ceramic substrates (Rubalit 708S, Hoechst Ceramtec). It exhibits good screen printing behavior with respect to flow and contour sharpness. After drying at 110° C., a wipe-resistant layer is obtained. The substrates are fired at 600° C. The conductivity of the strips is good.

The paste settles out rapidly and after 3–4 weeks a solid sediment is formed which can no longer be stirred up. The paste cannot then be used thereafter.

The amount of volatile organic solvent released during drying is 17%. A further 2% of organic substances are released during firing.

2. Preparation of the following paste in accordance with the invention is performed in the same way as in example 1.

TABLE 2

| | |
|---|---|
| 61.7% | Ag powder 3X (particle size $d_{50}$ = 4 μm, DEMETRON, Hanau) |
| 18.4% | Ag flakes D21 (particle size: 16% < 4 μm, 50% < 8 μm, 84% < 15 μm, DEMETRON, Hanau) |
| 8.7% | 1,3-butanediol |
| 4.7% | water |
| 4.0% | sintered glass 10 145 (83% PbO, 13% $B_2O_3$, 2% $SiO_2$, softening point 390° C., Cerdec, Frankfurt) |
| 2.5% | Lupasol P, 50% polyethylenimine in water (M. wt. 750000, produced by BASF, Ludwigshafen). |

Paste in accordance with Table 2 is printed onto ceramic substrates (Rubalit 708S, Hoechst Ceramtec). It exhibits very good screen printing behavior with regard to flow and contour sharpness. A wipe-resistant layer is obtained after drying at 110° C. The substrates are fired at 600° C. The conductivity of the strips is very good.

The paste settles out to only a small extent and can easily be stirred up. It can then be used again.

The proportion of volatile organic solvent released on drying is 8.7%. A further 1.25% of organic substances are released during firing.

3. The composition of this paste is given in Table 3.

TABLE 3

| | |
|---|---|
| 59.0% | Ag powder 3X (particle size $d_{50}$ = 4 μm, DEMETRON, Hanau) |
| 21.8% | Ag flakes D21 (particle size: 16% < 4 μm, 50% < 8 μm, 84% < 15 μm, DEMETRON, Hanau) |
| 14.4% | 1,3-butanediol |
| 3.6% | sintered glass 10 145 (83% PbO, 13% $B_2O_3$, 2% SiO2, softening point 390° C., Cerdec, Frankfurt) |
| 0.72% | Lupasol P, 50% polyethylenimine in water |
| 0.45% | SC 61 B, 40% ethoxylated polyethylenimine in water (M. wt. 40–60000, BASF, Ludwigshafen). |

The paste is printed onto ceramic substrates (Rubalit 708S, Hoechst Ceramtec). It exhibits very good screen printing behavior with respect to flow and contour sharpness. A wipe-resistant layer is obtained after drying at 110° C. The substrates are fired at 600° C. The conductivity of the strips is very good.

The paste settles out to only a small extent and can easily be stirred up. It can then be used again.

The amount of volatile organic solvent released on drying is 14.4%. A further 0.54% of organic substances are released during firing.

4. The composition of the paste is given in Table 4.

TABLE 4

| | |
|---|---|
| 59.5% | Ag powder 3X (particle size $d_{50}$ = 4 μm, DEMETRON, Hanau) |
| 18.5% | Ag flakes D21 (particle size: 16% < 4 μm, 50% < 8 μm, 84% < 15 μm, DEMETRON, Hanau) |
| 15.5% | 1,3-butanediol |
| 4.1% | sintered glass 10 145 (83% PbO, 13% $B_2O_3$, 2% $SiO_2$, softening point 390° C., Cerdec, Frankfurt) |
| 2.5% | Lupasol P, 50% polyethylenimine in water (M. wt. 750000, BASF, Ludwigshafen). |

The paste is printed onto ceramic substrates (Rubalit 708S, Hoechst Ceramtec). It exhibits very good screen printing behavior with respect to flow and contour sharpness. A wipe-resistant layer is obtained after drying at 110° C. The substrates are fired at 600° C. The conductivity of the strips is very good.

The paste settles out to only a small extent and can easily be stirred up. It can then be used again.

The amount of volatile organic solvents released on drying is 15.5%. A further 1.25% of organic substances are released during firing.

5. A paste for the edge-medullization of capacitors has a composition in accordance with Table 5.

TABLE 5

| | |
|---|---|
| 61.8% | Ag powder 3X (particle size $d_{50}$ = 4 μm, DEMETRON, Hanau) |
| 17.5% | Ag flakes D21 (particle size: 16% < 4 μm, 50% < 8 μm, 84% < 15 μm, DEMETRON, Hanau) |
| 14.4% | 1,3-butanediol |
| 4.1% | sintered glass 10 145 (83% PbO, 13% $B_2O_3$, 2% $SiO_2$, softening point 390° C., Cerdec, Frankfurt) |
| 2.2% | Lupasol P, 92.8% polyethylenimine in water (M. wt.: 750000, BASF AG, Ludwigshafen). |

The components are immersed to the required depth in the paste for 5 seconds, slowly drawn out again and then turned over. After drying for five minutes at 100° C., the coated components are fired at 600° C. A uniform, readily conductive silver coating is obtained.

The amount of organic solvents released on drying is 14.4%. A further 2.04% of organic substances are released during firing.

The paste settles out to only a small extent and can be stirred up. It may then be used again.

As the term "finely-divided" is used herein to describe the metallic and non-metallic powders, it has the same meaning as in the prior art listed herein above which is relied on and incorporated herein by reference.

Although the present invention has been illustrated by the use of silver powder and silver flakes, it is to be understood that the conventional finely divided metallic and non-metallic powder known in the art for use in the microelectronic industry can be used for preparing the paste according to the invention.

The pastes according to the present invention can be applied to a ceramic or glass surface as shown in the examples by depositing the paste onto the surfaces according to the desired design and then dried at up to 200° C. preferably 100°–110° C. or until a wipe resistant layer is obtained. Persons skilled in the art will be able to determine the optimum temperature to achieve this condition. Thereafter the product is fired to volatilize organics, generally at up to 800° C., preferably about 600° C.

Further variations and modifications of the foregoing amendment will be apparent to those skilled in the art and are intended to be encompasses by the claims appended hereto.

German priority application 196 47 044.7 is relied on and incorporated herein by reference.

We claim:

1. A paste for preparing fired-on layers, comprising a finely divided electrically conductive metallic powder and a binder of a water-soluble organic polymer and a water-soluble organic solvent, wherein the said polymer is polyethylenimine present in an amount of 0.3 to 3 wt. %, with reference to the total weight of paste.

2. The paste according to claim 1, containing 0.4 to 0.9 wt. % of polyethylenimine.

3. The paste according to claim 1 containing 8 to 17 wt. % of a polyalcohol as the water soluble organic solvent, up to 40% of which may be replaced by water.

4. The paste according to claim 1 wherein the finely divided metallic powder is silver.

5. The paste according to claim 1 wherein the finely divided metallic powder is a combination of silver powder and silver flakes.

6. The paste according to claim 1 which additionally contains sintered glass powder.

7. A method of forming a fired-on layer on a ceramic or glass surface comprising depositing the paste of claim 1 onto said surface, drying sufficiently to obtain a wipe-resistant layer and firing at an elevated temperature.

* * * * *